C. W. SPONSEL.
UNIVERSAL JOINT.
APPLICATION FILED APR. 10, 1917.
1,249,546.
Patented Dec. 11, 1917.
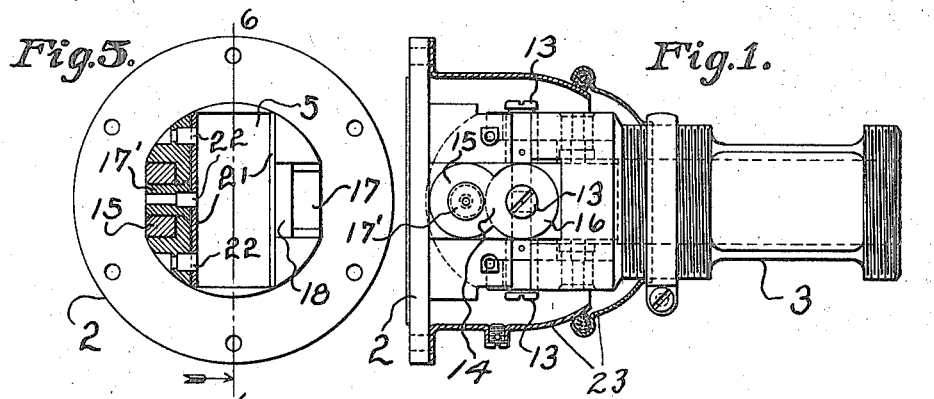
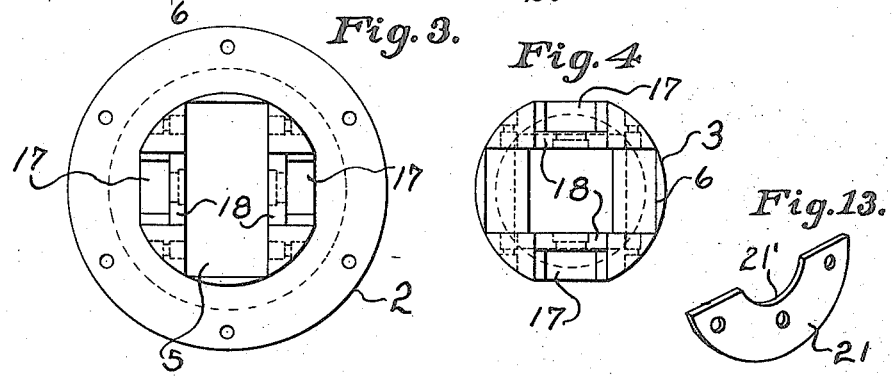
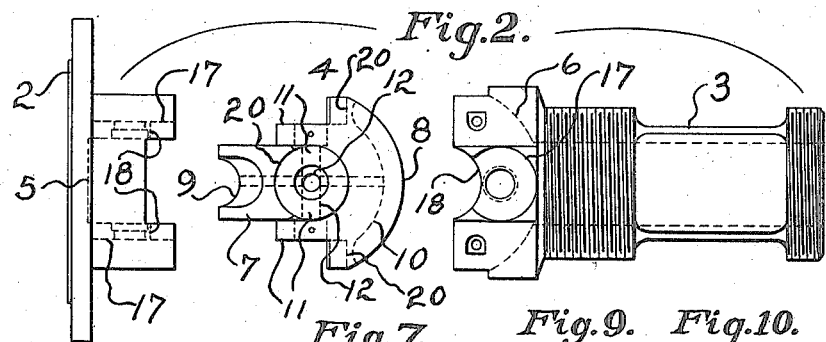
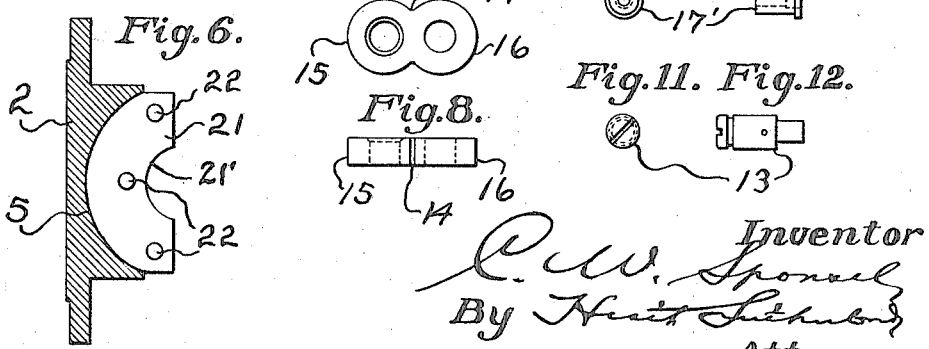
Inventor
C. W. Sponsel
By Heath Sutherland
Attorney

UNITED STATES PATENT OFFICE.

CHARLES W. SPONSEL, OF HARTFORD, CONNECTICUT, ASSIGNOR TO THE SPONSEL COMPANY, OF HARTFORD, CONNECTICUT, A CORPORATION OF CONNECTICUT.

UNIVERSAL JOINT.

1,249,546.  Specification of Letters Patent.  Patented Dec. 11, 1917.

Application filed April 10, 1917. Serial No. 160,948.

*To all whom it may concern:*

Be it known that I, CHARLES W. SPONSEL, a citizen of the United States, residing at Hartford, in the county of Hartford and State of Connecticut, have invented certain new and useful Improvements in Universal Joints, of which the following is a specification.

This invention relates to universal-joints. In my contemporaneously-pending application for patent for an article of this character, filed February 20, 1917, Serial No. 149,785, I have shown an organization which is an eminently desirable one. While as observed, the structure set forth in said application meets most conditions, it is one of the aims of the present invention to meet certain further requirements such as in automobiles wherein the joint is subjected to strains and jars. One of the motives I have in view is the provision of means which is positive in action to limit and preferably actually prevent the relative movement sidewise bodily of either or both of the main members of the device. Another object I have in view is reduction in cost of the main members of the joint. By the present organization it is not necessary that these members should be hardened, because I can get the same effect in a much less expensive manner.

In the drawings accompanying and forming part of the present specification I have shown in detail one convenient form of embodiment of the invention which to enable those skilled in the art to practise the invention will be set forth fully in the following description.

Referring to said drawings:

Figure 1 is an elevation of a joint involving the invention showing the same provided with a protective casing illustrated in section.

Fig. 2 is a like view with the parts of the joint separated and with the casing and certain other elements omitted.

Figs. 3 and 4 are inside face views of the main members respectively of the joint.

Fig. 5 is a view corresponding in effect to Fig. 3 but partially in section.

Fig. 6 is a section on the line 6—6 of Fig. 5, looking in the direction of the arrow.

Figs. 7 and 8 are views at right angles to each other of a bearing.

Figs. 9 and 10 are end and side views of a rivet.

Figs. 11 and 12 are detail views in end and side elevation of joint pins.

Fig. 13 is a perspective view of a shim.

Like characters refer to like parts throughout the several views.

In addition to the main members 2 and 3 there is a coupling member as 4. These three parts generally speaking are not unlike the corresponding elements shown in my prior application already identified. The two main members 2 and 3 respectively are furnished in adjoining faces with seats as 5 and 6. Although these seats are shown as part circular channels or grooves, this may not always be necessary. The seats 5 and 6 are in practice, or when the elements of the joint are assembled, transverse to each other, being as shown at right angles. They are intended in the organization illustrated, to receive opposite segments as 7 and 8 of the coupling member, which naturally are similarly disposed, that is preferably at right angles to each other. The segments 7 and 8 as a matter of lightness are longitudinally grooved as at 9 and 10 respectively along their curved faces, the ends of the grooves being closed. Said segments it will be understood are fitted in the seats 5 and 6, although as will hereinafter appear the lateral portions of the segments do not directly engage with the side walls of the respective seats 5 and 6.

Each of the segments 7 and 8 is provided on its inner side near the ends thereof with a bearing as 11, there being as will be understood four of such bearings, one pair overlapping and being at right angles to the other pair. These bearings as shown have openings or perforations as 12 to receive pivot pins as 13, there being as will be understood two pairs of these pivot pins 13, the pins of the respective pairs being coaxial and their axes being at right angles to each other. The openings 12 it will be seen are of two diameters, the pivots 13 being correspondingly formed. The portion of greater diameter of each pin fits the larger part of the opening 12 formed in a bearing 11, the smaller part of the opening receiving the smaller part of the pin and being located in the body of the coupling member 4.

It will be noted that the centers of the openings 12 and hence of the pivots 13 are in the same transverse plane. The pivot pins 13 turn in bearings as 14, of which there are four, each bearing comprising a body as 15 and a bearing portion 16, the bearings 14 being carried by the respective main members 2 and 3. It will, of course, be understood that the centers of the bearing openings in the bearing portions 16 of the main member 2 are coaxial and are at right angles to the corresponding portions of the other bearings, although the centers of the four bearings are in the same transverse plane. The main members 2 and 3 have part circular openings as 17 in which the bodies 15 of the respective bearings 14 are driven, being held in the seats by headed studs as 17', to securely hold the bearings 14 in operative relation. These bearings are preferably made separate from the respective bodies, although this may not always be necessary.

The bearings 11 in addition to receiving the pivots or journals 13 in the manner already described, also subserve a further and quite important function. In the construction shown, they act as a convenient means in conjunction with coacting means on the main members 2 and 3 to prevent lateral movement bodily of said main members and this without in any wise affecting the proper universal relative movement of the two main members. These bearings 11 play in the present case an important part in this connection. They are adapted to enter as shown, concave seats as 18 in the respective main members 2 and 3. It will be clear that the radius of the bearings 11 is the same as that of the seats 18. It will also be understood that each of the main members 2 and 3 has two of these bearing seats 18, the transversely alined seats 18 of the member 2 being at right angles to the corresponding seats of the member 3. The seats of the members 2 and 3 as may be inferred, are upon opposite arcs.

I desire to further call attention to the fact that the transverse segments 7 and 8 have on their inner faces and ends concave seats 20 which are adapted to receive the bearing portions 16 to which I have already referred. Although the seats 18 and 20 which receive respectively the bearings 11 and the bearing portions 16 are upon arcs opposite to each other, these arcs nevertheless are struck from a center intersected by a plane passing through the centers of the openings 12 and also through the centers of the pivot pins 13. In view of the construction described, it will be understood that I prevent bodily relative lateral movement of the sectors 2 and 3 without interfering with the proper relative universal motion thereof.

The seats 5 and 6 receive shims as 21 which are fastened suitably to the side walls of the respective seats. These shims consist of segmental hardened plate which can be pinned to the side walls of the grooves by pins 22. The segments 7 and 8 engage the inner faces of these hardened shims 21 and thus hold the securing pins 22 against accidental displacement. The shims bottom in the respective seats 5 and 6 and their outer edges are concaved as at 21' to receive the bearing portions 11.

From the foregoing statements taken in connection with the annexed drawings, it will be evident that my universal joint comprises main members provided with bearings, a cruciform coupling member pivotally connected with the bearings of the main members to permit universal movement relatively of said main members, the coupling member being interlocked with the main members and the bearings being interlocked with the coupling member to prevent movement bodily of the main members in a direction transverse to their axes of rotation. The bearings to which I have referred are, as will be understood, separate from the bodies of the main members, although when the bearings are in operative relation on the supporting main members or the bodies thereof, each of the main members is forked or bifurcated, and when the main members are in assembled relation, these forks are at right angles to each other. I have referred to the fact that the coupling member is interlocked with the main members and that the bearings are interlocked with the coupling member to prevent movement bodily of the main members in a direction transverse to their axes of rotation. In the present case the interlocked relations are effected by arcuate engaging surfaces, and although the arcs are opposite to each other, they are nevertheless concentric with the pivots of the cruciform coupling member. In the organization hereinbefore described, these arcuate faces are arranged 90 degrees apart, there being as will be understood several of these faces in each group and the faces rocking upon each other interfere in no wise with the relative angular movement of the main members and do present a highly effective means of resisting movement bodily of the main members in a direction laterally of their axes of motion, which is a highly important condition.

The joint or at least the operative parts thereof may be if desired equipped with a casing as 23. Such a casing is not uncommon in this style of device and therefore requires no further detailed description. I desire to note the fact that I am in no sense limited to the foregoing construction, because as I have already observed I may depart in many ways therefrom within the scope of the invention defined by my claims. I have mentioned the fact that I provide bearings as 14. These bearings in the organization shown are separate or distinct from the respective main sections which is a desirable construction, but I am in no sense limited to this. By making the bearings and the shims separate from the main members, I can obviously harden these bearings and shims which are the parts subjected to the maximum wear, without unduly hardening the remaining portions of the main members. It will be, of course, understood that the main members equipped with bearing portions of which the shims described are merely illustrative might be made integral, but this is not the construction I prefer.

What I claim is:

1. A universal joint comprising main members provided with bearings, a cruciform coupling member pivotally connected with the bearings of the main members to permit universal movement relatively of said main members, the coupling member being interlocked with the main members and the bearings being interlocked with the coupling member to prevent movement bodily of the main members in a direction transverse to their axes of rotation.

2. A universal joint comprising main members provided with bearings, a cruciform coupling member pivotally connected with the bearings of the main members to permit universal movement relatively of said main members, the coupling member engaging the main members along arcuate engaging surfaces, and the bearings engaging the coupling member along arcuate engaging surfaces to prevent movement bodily of the main members in a direction transverse to their axes of rotation, the arcs of said engaging surfaces being concentric with the pivotal means of the coupling member.

3. A universal joint comprising main members provided with bearings, a cruciform coupling member pivotally connected with the bearings of the main members to permit universal movement relatively of said main members, the coupling member and the bearings having arcuate engaging surfaces opposite to each other and the bearings and the main members having opposite engaging arcuate faces, the arcs of the faces being concentric with the axes of the pivot means and functioning to prevent bodily movement relatively of the main members in a direction transverse to their axes of rotation.

4. A universal joint comprising bifurcated main members, the forks of said main members being at right angles to each other, a cruciform coupling member pivotally connected between the branches of the forks, the pivot means being in the same same plane extending transversely of the main members to thus permit universal movement relatively of said main members, the outer ends of the branches being arc-shaped and the main members respectively having arcuate seats to be engaged by the arcuate ends of the branches, the arcs being struck from a center intersected by said plane, the coupling member having pivot-receiving bearings on opposite arcs and the main members having arcuate seats to be engaged by the arcuate surfaces of said pivot-receiving bearings, the last mentioned faces being concentric with said center and the several engaging arcuate surfaces preventing movement bodily of the main members in a direction transverse to their axes of rotation.

5. A universal joint comprising bifurcated main members, the forks of said main members being at right angles to each other, an integral cruciform coupling member pivotally connected between the branches of the forks, the pivot means being in the same plane extending transversely of the main members to thus permit universal movement relatively of said main members, the outer ends of the branches being arc-shaped and the main members respectively having arcuate seats to be engaged by the arcuate ends of the branches, the arcs being struck from a center intersected by said plane, the coupling member having pivot receiving bearings on opposite arcs and the main members having arcuate seats to be engaged by the arcuate surfaces of said pivot receiving bearings, the bearings being separate from the bodies of the respective main members, the last mentioned arcuate faces being concentric with said center and the several engaging arcuate surfaces preventing movement bodily of the main members in a direction transverse to their axes of rotation.

6. A universal joint comprising bifurcated main members, the forks of said main members being at right angles to each other, a cruciform coupling member pivotally connected between the branches of the forks, the several pivots uniting the cruciform member to said main members being in the same plane and said plane extending transversely of the main members to thus permit universal movement relatively of said main members and the pivots acting to prevent displacement longitudinally of the main members, the joint having means acting independently of the pivot to prevent movement relatively bodily of the main members in a direction transverse to their axes of rotation.

7. A universal joint comprising main members provided with bearings and a cruciform coupling member pivotally connected with the bearings of the main members to permit universal movement relatively of said main members, the main members having seats transverse to each other and the coupling member having segments extending into the seats, the sides of the seats having plates which are engaged by the respective segments and also having fastenings to hold the plates in place, the respective segments preventing the fastenings from being displaced when the parts are in working relation.

In testimony whereof I affix my signature in the presence of two witnesses.

CHARLES W. SPONSEL.

Witnesses:
L. L. MARKEL,
HEATH SUTHERLAND.